Figure 1:
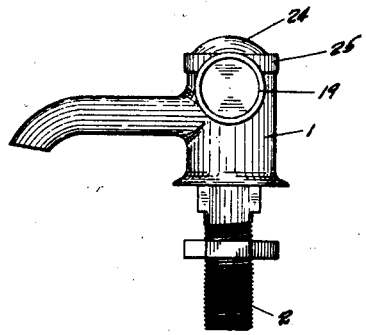

Oct. 18, 1927.

C. H. DUNCAN 1,645,900

VALVE

Original Filed Sept. 27, 1921

Charles H. Duncan
Inventor.

By

Attorney.

Patented Oct. 18, 1927.

1,645,900

UNITED STATES PATENT OFFICE.

CHARLES H. DUNCAN, OF ERIE, PENNSYLVANIA, ASSIGNOR OF ONE-THIRD TO FRANK C. RICHARDSON AND ONE-THIRD TO WILLIAM F. JOHNSON, BOTH OF ERIE, PENNSYLVANIA.

VALVE.

Application filed September 27, 1921, Serial No. 503,522. Renewed August 13, 1926.

The invention is particularly designed as a basin cock and in the drawings is so exemplified. The valve is formed with a body which can be readily machined and the valve head and seat are removable so that the valve may be kept in order indefinitely. The valve is operated through a cam which is so shaped as to provide a self-closing valve and the valve may be locked in open position with very little alteration in the general construction of the valve. Other details of the invention will appear from the specification and claims.

The invention is illustrated in the accompanying drawings as follows:—

Fig. 1 shows a side elevation of the valve.

Figure 2:
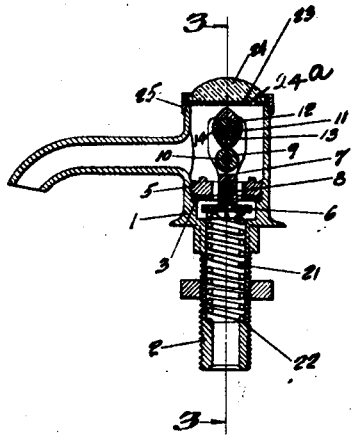

Fig. 2 a central vertical section through the valve.

Figure 3:
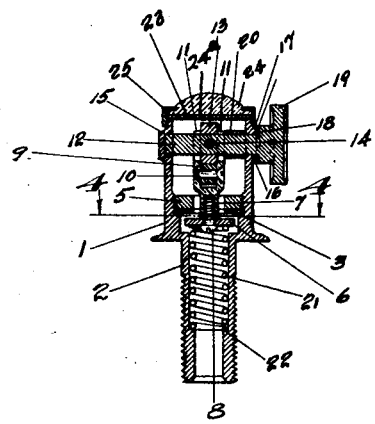

Fig. 3 a section on the line 3—3 in Fig. 2.

Figure 4:
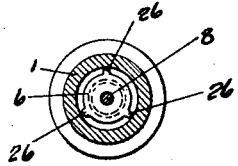

Fig. 4 a section on the line 4—4 in Fig. 3.

Figure 5:
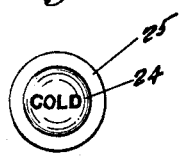

Fig. 5 a plan view of the index plate.

Figure 6:
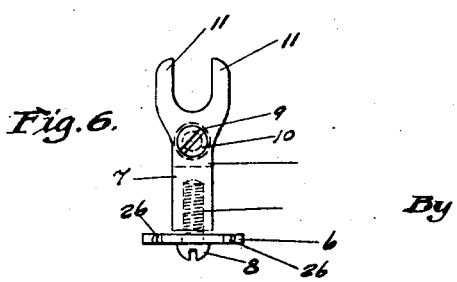

Fig. 6 a detail view of the valve stem.

1 marks the valve body. This is provided with a screw-threaded sleeve or shank 2 by means of which it may be attached to a basin. The valve body is provided with a shoulder 3 on which is carried a removable seat preferably of soft material. A packing 5 is screwed back of the seat clamping the seat on the shoulder, the packing 5 and seat having a stem opening therethrough.

The valve head 6 is preferably in the form of a flat sheet metal disc and is secured to a stem 7 by a screw 8. The stem 7 is bifurcated at its upper end and has the roller 9 arranged between the arms of the forked portion, the roller being mounted on a screw 10 extending through the arms of the forked portion of the stem. The upper ends of these arms are bifurcated at 11 and a transverse shaft 12 extends between the arms of the forked portion 11. A cam 13 is mounted on the shaft between the arms of the first-mentioned fork and operates upon the roller 9, the eccentric being secured by a screw 14. The shaft extends into a closed bearing 15 at one end of the body and through an open bearing 16 at the opposite end of the body. The bearing 16 is surrounded by an annular projection 17 which extends into an annular cavity 18 in the handle 19, the handle being arranged on the end of the shaft 12. A packing is arranged in the cavity and thus forms a seal for the outer end of the open bearing. A sleeve 20 is arranged on the shaft and is adapted to lock the shaft against longitudinal movement.

A spring 21 is arranged in the shank 2 and rests on a shoulder 22 in said shank extending upwardly engaging the disc or head 6. The spring is preferably a coil spring permitting the passage of fluid through it.

The top of the valve is closed by a plate 23 on which is arranged an index 24 and the index and closure are secured in place by a flange nut 25. A gasket 24$^a$ is arranged under the plate 23.

It will be observed that the valve head is opened in the direction of the flow and that the seat and all the parts are removable in the direction of the flow, thus permitting of an assembling and machining that facilitates the manufacture. It will also be noted that the stem is fully supported against movement out of alinement by the shaft 12 and parts attached thereto so that a smooth operation of the valve is assured. The valve head is preferably provided with slight projections 26 for centering or guiding it as it is opened.

By using a round handle it would be impossible to lock the valve open as it is commonly done with a self-closing faucet.

What I claim as new is:—

1. In a valve, the combination of a body having a shoulder; a soft seat resting on the shoulder; a backing securing the seat in place; a sheet metal disc forming a head operating on the seat; and a stem extending through the seat for operating the head.

2. In a valve, the combination of a body having a shoulder; a soft seat resting on the shoulder; a backing securing the seat in place; a sheet metal disc forming a head operating on the seat; a stem extending through the seat for operating the head; and guide projections on the head.

3. In a valve, the combination of a body having a seat therein; a head operating on the seat; a stem extending from the head and through the seat, said stem being bifurcated and the arms of the forked portion being slotted; a transverse shaft extending through the slots in the arms of the forked portion of the stem; and means on the shaft between the arms operating the stem, said means acting on the arms to guide the stem against deflection in one direction and the shaft operating on the walls of the slots to guide the shaft against deflection in another direction.

4. In a valve, the combination of a body having a seat therein; a head operating on the seat; a stem extending from the head and through the seat; said stem being bifurcated and the arms of the forked portion being slotted; a transverse shaft extending through the slots in the arms of the forked portion of the stem; and means on the shaft between the arms operating the stem comprising a cam, said cam engaging the arms and guiding the stem as to deflection in one direction and the shaft engaging the walls of the slots for guiding it against deflection in another direction.

5. In a valve, the combination of a body having a seat therein; a head operating on the seat; a stem extending from the head and through the seat, said stem being bifurcated; a roller between the arms of the forked portion of the stem; a transverse shaft; and a cam on the shaft operating on the roller, said arms being bifurcated and extending each side of the transverse shaft.

6. In a valve, the combination of a body having a seat; a head operating on the seat; a stem extending from the head and through the seat; a transverse shaft operating on the stem; a closed bearing at one side of the body for the shaft; an open bearing for the shaft at the opposite side of the body; and means for sealing the outer end of said open bearing comprising a projection on the body surrounding said outer end of the open bearing and a groove in an enlargement on the shaft for receiving said projection.

7. In a valve, the combination of a body having a seat; a head operating on the seat; a stem extending from the head and through the seat; a transverse shaft operating on the stem; a closed bearing at one side of the body for the shaft; an open bearing for the shaft at the opposite side of the body; means for sealing the outer end of said open bearing comprising a projection on the body surrounding said outer end of the open bearing and a groove in an enlargement on the shaft for receiving said projection, and means for locking the shaft against axial movement.

In testimony whereof I have hereunto set my hand.

CHARLES H. DUNCAN.